United States Patent [19]

Koveshnikov et al.

[11] 4,165,829

[45] Aug. 28, 1979

[54] METHOD OF FEEDING ELECTRODE WIRE AND APPARATUS FOR PERFORMING SAME

[76] Inventors: Serafim P. Koveshnikov, ulitsa Depovskaya, 3a, kv. 30, Moskovskaya oblast, Lobnya; Viktor F. Pavlov, Putevoi proezd, 6, kv. 45; Stanislav G. Fedorov, ulitsa Inzhenernaya, 18, korpus 1, kv. 41, both of Moscow, all of U.S.S.R.

[21] Appl. No.: 850,044

[22] Filed: Nov. 9, 1977

[51] Int. Cl.$^2$ .............................................. B65H 17/36
[52] U.S. Cl. .......................................... 226/4; 226/8; 226/113; 226/115; 226/151; 226/164; 226/166; 226/167
[58] Field of Search ............... 226/128, 4, 8, 113–115, 226/141, 158, 160, 162–164, 167, 165, 166, 151

[56] References Cited

U.S. PATENT DOCUMENTS

| | | | |
|---|---|---|---|
| 2,604,064 | 7/1952 | Sefton | 226/128 |
| 3,101,689 | 8/1963 | Hammond | 226/167 X |
| 3,912,147 | 10/1975 | Dube | 226/167 X |

FOREIGN PATENT DOCUMENTS 777111  6/1957  United Kingdom ..................... 226/167

Primary Examiner—Richard A. Schacher
Attorney, Agent, or Firm—Fleit & Jacobson

[57] ABSTRACT

The disclosed method consists in that the electrode wire has the portion thereof intermediate the supply coil and the welding arc alternatingly retained at one of two points, with an effort applied to the wire in the respective retaining point, causing transverse oscillation of the wire. The effort is applied at an angle substantially short of 90° relative to the direction of feeding the wire toward the welding zone. The apparatus of performing the disclosed method comprises a plurality of gripping means for retaining the wire, each including a plate apertured for passage of the wire and a spring accommodated between a housing and the plate, the plate of one of the gripping means being mounted for reciprocation in the direction of feeding the wire toward the welding zone and having its side surface adapted to cooperate with an actuator mounted on the output shaft of the drive effecting the feed and transverse oscillations of the wire advanced toward the welding zone.

The invention enables to eliminate the loss of longitudinal stability by thin wire stock, and to increase the efficiency of feeding thick wire stock toward the welding zone.

12 Claims, 12 Drawing Figures

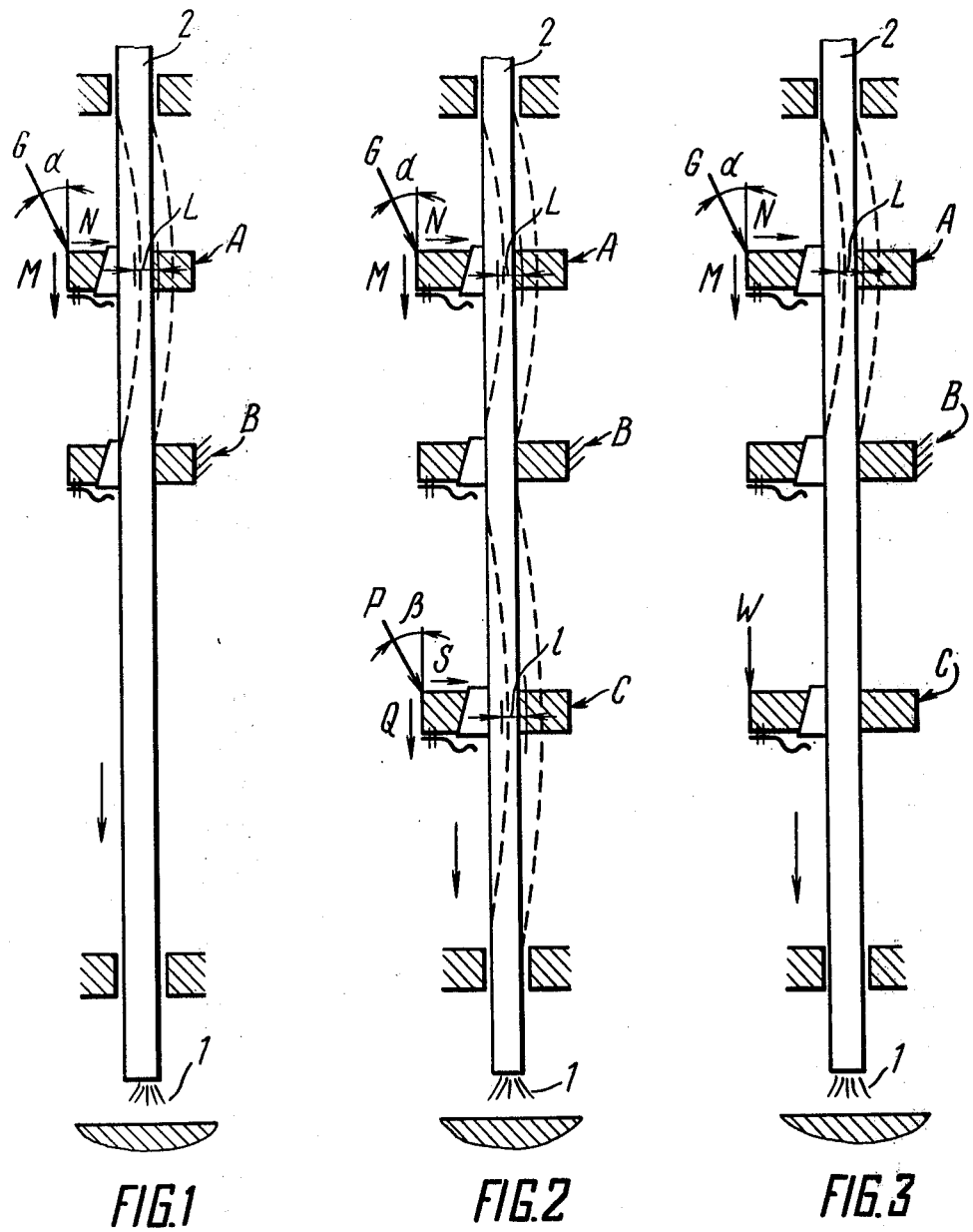

METHOD OF FEEDING ELECTRODE WIRE AND APPARATUS FOR PERFORMING SAME

The present invention relates to welding, and, more particularly, it relates to methods for feeding a wire electrode toward the welding zone and to apparatus performing such methods.

The invention can be utilized to utmost advantage in semi-automatic welding machines.

Known in the art is a method of feeding an electrode wire toward the welding zone, including retaining the wire alternatingly at two points and applying thereto an effort causing transverse oscillation of the wire (see the U.S.S.R. Inventor's Certificate No. 416,193, Int. Cl. B 23 k 9/12, filed on Nov. 16, 1971).

The known method is characterized in that the welding wire is alternatingly retained at two points at any portion intermediate the supply coil and the welding arc, with an effort applied to the wire intermediate these two points, causing the wire to sag. Owing to repeated sagging, the wire advances toward the welding zone.

The disadvantages of the known method are difficulties encountered when feeding relatively thin (up to 1.2 mm in diameter) wire stock, and insufficient efficiency of feeding thicker (above 1.6 mm in diameter) wire stock.

These disadvantages are caused by:

the thinner wire losing its longitudinal stability, when being fed;

bending of the thicker wire being energy-consuming.

According to the known method, in order to ensure that no bending traces are left on the wire stock, the wire should be bent smoothly along an arc of a circle; however, in order to attain this, a very definite spacing of the retaining points is required. The wire stock is liable to lose its longitudinal stability with excessive resistance offered to its advance along the passage, whereby the wire bends sinuously between the retaining points and would not be fed toward the welding zone.

The method of feeding is based on the difference of the lengths of a wire element between two points, when this element is, respectively, bent or running straight. Consequently, through a single bending cycle, the wire is fed into the welding zone by this difference between the lengths of the straight and bent wire elements. Prior to applying a tranverse effort to the wire, the latter is retained at a point closer to the welding zone, the action of this effort pulling the wire off the supply coil and making the wire bend between the retaining points; at this stage the wire is not retained at the point closer to the supply coil, so that the wire unobstructedly passes through this point. Then the wire is unbent (with the effort causing the transverse oscillation being applied in the opposite direction), with the wire being retained at the point closer to the supply coil and released at the point closer to the welding zone, whereby the surplus wire, i.e. the difference between the bent and unbent lengths between the retaining points, is fed into the welding zone. Then the abovedescribed cycle is repeated.

In case of thicker wire stock, a considerable effort is to be applied to bend it, so that extra energy is consumed.

Known in the art is an apparatus for feeding electrode wire toward the welding zone, comprising a housing with at least two gripping means or clamps mounted therein and adapted to retain the wire, and a drive for effecting transverse oscillation of the wire (see the U.S.S.R. Iventor's Certificate No. 416,193, Int. Cl. B 23 k 9/12, filed on Nov. 16, 1971).

In the known apparatus the drive effecting the transverse oscillation includes an actuator reciprocated perpendicularly to the geometric axis of the wire being fed, directly applying the oscillating effort to the wire.

The disadvantages of the known apparatus are:

insufficiently stable feeding of thin wire stock, caused by the wire being liable to lose its longitudinal stability;

the necessity of having a powerful drive, when thicker wire stock is fed, since the actuator has to apply a considerable effort to bend the wire transversely.

It is the main object of the present invention to provide a method of feeding electrode wire toward the welding zone, which should preclude the loss of longitudinal stability by a thin wire being fed.

It is another object of the present invention to provide a method of feeding electrode wire toward the welding zone, which should enhance the efficiency of the drive during feeding thick wire toward the welding zone.

It is still another object of the present invention to provide an apparatus for the aforementioned purpose, which should be capable of feeding both thinner and thicker wire stock made of either soft or rigid materials, and which should be also capable of feeding flux core wire toward the welding zone.

It is yet another object of the present invention, in addition to the abovementioned ones, to provide an apparatus which should provide for a high efficiency factor of its drive.

It is still another object of the present invention to provide an apparatus for feeding electrode wire toward the welding zone, which should be simple in manufacture, in operation and in maintenance, and which should be more lightweight than the hitherto known similar structures.

These and other objects are attained in a method of feeding electrode wire toward the welding zone, including alternatingly retaining the wire at two points, one point at a time, and applying to the wire an effort causing its transverse oscillation which, in accordance with the invention, is applied at the retaining point at an angle substantially short of 90° relative to the direction of feeding the wire toward the welding zone.

Owing to the oscillation being applied in the herein disclosed manner:

the free span of the wire between the retaining points has been reduced, which enhances the longitudinal stability of the wire, and, therefore, enables to feed thin and soft wire stock;

energy consumed by bending a thick wire is saved, because the wire is no longer being bent, but vibrates at an amplitude defined by the diameter of the passage through which it is being advanced, on account of the component of the oscillating effort, acting perpendicularly to the wire axis; the wire being fed into the welding zone on account of the component of the oscillating effort, acting parallel with the wire axis.

As a rule, the oscillating effort is applied at an angle short of 45° to the wire feed direction, so as to provide for greater feed effort and a lesser vibrating effort.

It is commonly known, that vibration brings about reduction of the effort required to push the wire through a guiding passage, this reduction being essentially dependent on the frequency of the vibration, and not on its amplitude. Therefore, it is sufficient to have the guiding passage of a diameter within twice the diameter of the wire, to feed the vibrating wire into the welding zone, and at the same to provide for its longitudinal stability.

If the oscillating effort is applied at an angle of 0° relative to the axis of the wire, there is effected a method of pulse feeding of the wire without transverse oscillation, which has been found to require a drive 20 percent more powerful than if the transverse oscillation were present, so that this technique is economically unattractive. If the oscillating effort is applied to a wire at 90°, the pulsing feed method is that of the prior art, although it requires for its implementation a drive more powerful than that of the prior art, because, in addition to bending the wire, there is required addition energy for oscillating the wire-retaining gripping means or clamp.

In applications were a relatively long flexible hose is used, it is expedient to retain the wire additionally at one extra point and to apply to the wire at this point, at an angle substantially short of 90° to the wire feeding direction, an effort causing transverse oscillation.

Due to the herein disclosed method, there can be realized a push-pull system of feeding a wire via a long hose by two drives, without the necessity of timing their operation.

Alternating retaining of the wire at two points can be effected at the inlet of the hose, and then retaining at the single point is effected at the outlet of the hose. However, alternatively, the wire can be retained at two points at the outlet of the hose and at one point at the inlet thereof. The frequency of oscillation caused by the application of the effort at the extra point should be substantially higher than in the two other points. The surplus wire inadvertently appearing behind the third point is automatically returned by the inherent elasticity into the initial position when the oscillating effort is relieved. Therefore, at the additional point the transverse oscillation of the wire is accompanied by longitudinal oscillation thereof of which the amplitude equals the difference between the feed rates in the zone of retaining at the two points and in the zone of the additional point, which further reduces the effort required to advance the wire through the hose.

In applications were a long flexible hose is used for feeding the wire therethrough, it is also possible to retain the wire additionally at an extra point and to apply thereto at this point a pulsing effort causing its mere longitudinal oscillation.

When the effort applied at the third point is a pulsing longitudinal one, somewhat greater energy is required to advance the wire, but, on the other hand, known gripping devices can be used at this third point, e.g. a ball-type clamp or any other suitable known one.

The object of the invention is also attained by an apparatus comprising a housing having mounted therein at least two clamps or gripping means for retaining the wire and a drive for effecting advance and transverse oscillation of the wire being fed toward the welding zone, with an actuator mounted on the output shaft of this drive, in which apparatus, in accordance with the present invention, each clamp comprises a plate with an aperture for passage of the wire, the plate of one of the clamps being mounted for reciprocation in the direction of feeding the wire toward the welding zone and having its side surface adapted for cooperation with the actuator.

The herein disclosed structure of the apparatus enables:

to feed both relatively thin (0.5 to 1.2 mm in diameter) wire stock and relatively thick on (1.6 mm and more in diameter) of either soft (aluminum, copper, etc.) or rigid (steel, bronze, etc.) materials, owing to the reduction of the span of the wire in the feed zone;

to feed flux core wire stock (with the clamp additionally sqeezing the wire, as it feeds it);

to attain high efficiency of the drive (the energy of the prime mover is transmitted to the wire with-out additional transmission elements and is not wasted on bending thick wire stock);

to render the apparatus simple in manufacture, in operation and in maintenance (the apparatus incorporating but a few components);

to reduce the weight of the apparatus (with a less powerful motor and smaller loads within the mechanism per se).

To ensure uniform wire feed rate, the housing has mounted thereon a bell crank having one its arm cooperating with the actuator at a point opposite to that of cooperation thereof with the movable plate, the other arm of the bell crank cooperating with the plate of the other clamp, which in this embodiment is likewise mounted for reciprocation in the wire-feeding direction, i.e. in the direction of feeding the wire toward the welding zone.

The abovedescribed structure of the apparatus provides for not pulse-wise, but practically uniform feed rate of the wire, owing to the fact that through the first half of the feed cycle the wire is fed by one clamp, and during the second half by the other one, i.e. both the forward and return strokes of the actuator are utilized for advancing the wire.

To arrange the drive in the housing coaxially with the wire being fed, with provisions for reciprocation in the direction of feeding the wire toward the welding zone, intermediate rods are incorporated in a number equalling that of the clamps, each rod having one its end cooperating with the actuator, and the other end with the side surface of the respective plate, each plate being mounted for reciprocation in the direction of feeding the wire toward the welding zone.

The abovedescribed structure enables to design compact wire-feeding devices, particularly if a motor with a hollow shaft is incorporated.

In applications were two electrode wires are alternatingly fed toward the welding zone, the apparatus preferably comprises the second pair of clamps, wherein the movable plate has its side surface cooperating with the actuator at a point diametrally opposing the point of cooperation of the plate of the first pair of the clamps with the actuator.

To provide for feeding the wire with facilities for infinite mechanical adjustment of its feed rate, the housing can have mounted therein a movable abutment limiting the return stroke of the movable plate, the adjustmentwise motion of this abutment being effected with aid of a screw and nut couple of which the screw is a part of the housing.

The abovedescribed structure provides for infinite adjustment of the feed rate by means of the simplest assembly, i.e. of the screw and nut couple, making a sophisticated electric control circuit redundant. An uncontrollable alternating-current motor can be incorporated in the drive of this embodiment.

To provide for stable feeding of thin and soft wire stock and to prevent bending of the wire adjacent to the movable plate, the housing can have mounted therein a carrier reciprocable in the direction of feeding the wire toward the welding zone, the carrier having a groove adapted to accommodate the movable plate, and also having a guide carrying the spring of the movable clamp, the width of the groove equalling the thickness of the plate, and the sloping angle of the walls of the groove being within 5° to 45°.

The last-described structure of the apparatus provides for absence of bending of the wire adjacent to the movable plate even if the electrode wire is accidentally welded-on in the current-conducting welding torch head, which would not be attained by the previously described structures. In this embodiment the free span of the wire in the zone of the movable plate of the clamp has been positively minimized. The limited angle of inclination of the plate limits the depth to which the plate cuts into the wire at sudden overloads, which precludes any great harm being done to the surface of the wire. Therefore, when an obstacle to a normal operation is removed, the wire-feeding process can be resumed without any readjustment.

To perform the herein disclosed wire feeding method with the use of not only plate-type clamps, or gripping means but also of other hitherto known ones, such as ball-type, collet-type, wedge-type, eccentric-type, etc., the herein disclosed apparatus can comprise a housing having mounted therein at least two clamps or gripping means for retaining the wire and a drive for effecting advance and transverse oscillation of the wire being fed, with an actuator mounted on the output shaft of the drive, in which apparatus there is also incorporated a parallelogram linkage of which the cranks cooperate with the actuator of the drive, to be oscillated thereby, and the connecting rod is a guide driven through translatory motion and carrying one of the clamps, the other clamp being stationary in the housing.

With the apparatus having the last-described structure, it is very simple to insulate it electrically from the drive, e.g. by making either the cranks or the connecting rod of a dielectric material, or else by incorporating insulators in the pivots, such insulating being necessary when performing welding with an oscillator.

The present invention will be further described in connection with embodiments thereof, with reference being has to the accompanying drawings, wherein:

FIG. 1 schematically illustrates a wire retained at one of two points, and the direction of the efforts driving the wire toward the feeding zone and bending the wire;

FIG. 2 illustrates a wire retained at three points, and the direction of the efforts driving the wire toward the feeding zone and bending the wire;

FIG. 3 illustrates a wire retained at three points, with a pulse-wise longitudinal effort being applied to the wire at the third point;

Figure 4:
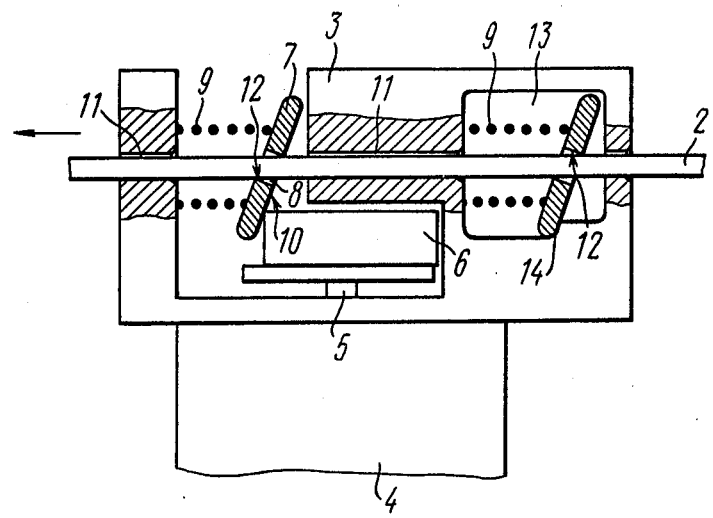
FIG. 4 is a longitudinal sectional general view of a wire feeding apparatus wherein each clamp or grip ping means is in the form of a plate spring-urged to the housing, in accordance with the invention.

Disclosure is made of a method of feeding an electrode wire toward a welding zone, consisting in retaining the wire, prior to its being fed into the zone, alternatingly at two points, one point at a time, and applying to this wire an effort causing its transverse oscillation, this effort being applied to the wire at a retaining point at an angle substantially short of 90° relative to the feeding direction.

The schematic drawing in FIG. 1 illustrates the herein disclosed method.

At any portion intermediate the welding zone 1 (the zone where the welding arc has been ignited) and a coil with a supply of the consummable electrode wire 2, the latter is alternatingly retained at two points A and B, one point at a time. At some angle short of 90° relative to the feed direction (indicated with the arrow in the drawing), there is applied to the wire 2 at the retaining point A an effort G causing transverse oscillation of the wire 2. Under the action of the transverse (relative to the feed direction) component N of the effort G the wire 2 sags by a value L, while under the action of the longitudinal component M of the same effort G the wire 2 is fed through a certain length toward the welding zone 1, this length depending directly on the time of application and the rate of application of the effort G.

For simplicity sake, let us further call the transverse component N of the effort G and the longitudinal component M of this efforts G, respectively, efforts N and M.

At the moment when the effort G is applied to the wire 2 at the point A, the wire is released at the other point B, and thus the wire is unobstructedly advanced into the welding zone 1.

The moment the effort G applied at the point A is relieved, the wire 2 is released at this point and retained at the point B. At the same moment the wire unbends by its inherent resilience. By acting repeatedly with the effort G upon the wire 2 at the point A, the wire 2 is fed incrementally, or pulse-wise toward the welding zone 1 under the effort M, while undergoing transverse oscillation determined by the sag L under the action of the effort N.

With the aim to feed the electrode wire 2 toward the welding zone 1 through a long flexible hose, the wire 2 is additionally retained at an extra point, and an effort is applied to the wire 2 at this extra point at an angle short of 90° but in excess of 0° relative to the feeding direction, to cause transverse oscillation of the wire.

The feeding method is illustrated in FIG. 2. The effort P applied at the extra point C at an angle β to the feeding direction, substantially short of 90°, divides into a transverse component S (to be referred to as the effort S) causing a sag 1 of the wire 2, and a longitudinal component Q (the effort Q) advancing the wire 2 toward the welding zone 1. The oscillation of the wire under the action of the effort S reduces the effort required to advance the wire 2 through the hose, whereas the pulling effort Q adds itself to the pushing effort M and thus facilitates the advancing of the wire 2 through the hose.

An essential condition of effecting the above-described feeding method is that the frequency of the application of the effort P at the additional point C should be either equal to or in excess of the frequency of the application of the effort G at the point A, or else the length of the wire 2 advanced at a single pulse at the point C should be equal to or in excess of that at the point A, with the same frequency of the application of the two efforts.

In general, the length of the wire 2 advanced per unit of time at the point C should be positively either equal to or in excess of the length of the wire 2 advanced at the point A. Let us presume that the frequency of the application of the effort G at the point A and that of the application of the effort P at the point C are equal, but the length of the wire 2 advanced at a single pulse of the application of the effort P at the point C is greater than that advanced at a single pulse of the application of the effort G at the point A, i.e. that the rates of the application of the two efforts are different, and the rates of the advance of the wire 2 are different accordingly. Then, at the point C there would be advanced a certain length of the wire 2, plus some extra length, corresponding to the greater rate of advance at the last-mentioned point. This extra length of the wire 2 is taken from the hose, since the length of the wire 2 within the hose is always greater than the length of the hose per se, owing to bends in the wire. Consequently, there is advanced toward the welding zone 1 an amount of the wire 2, corresponding to the rate of advance at the point C. However, when the efforts G and P are relieved, respectively, at the points A and C, a certain amount of the wire 2, corresponding to the difference between the advance rates at the points A and C, returns back into the hose, owing to the inherent resilience of the wire 2.

Alternatively, to feed the wire 2 toward the welding zone 1 through a long flexible hose, the wire 2 can be additionally retained at an extra point, and a pulsing effort can be applied to the wire 2 at this extra point, to cause longitudinal oscillation of the wire 2.

This feeding method is schematically illustrated in FIG. 3.

A pulsing longitudinal effort W applied at the point C is added to the effort M at the point A and facilitates advancing the electrode wire 2 along the hose. With the same frequency of application of the efforts G and W, the rate supplied by the effort W should be either equal to or in excess of the rate supplied by the effort G.

When the rates of advance supplied by the efforts G and W are equal, the frequency of application of the effort W should be equal to or greater than the frequency of application of the effort G. In the method of the present invention no transverse oscillation is created at the point C, which fact somewhat impedes the advance of the wire 2 through the hose, as compared with the previously discussed embodiment, but, on the other hand, according to this embodiment known per se devices can be utilized to retain the wire 2 at the point C, e.g. ball-type clamps or grips.

The last-described embodiment of the method neither requires precise timing of synchronization of the operation of the drives creating the efforts G and W.

The herein disclosed method can be performed by an apparatus illustrated in FIG. 4, intended for feeding an electrode wire 2 toward a welding zone 1, with application of transverse oscillation to the wire.

There is herein disclosed the apparatus comprising a housing 3 accommodating therein two clamps or gripping means for retaining the wire 2 and a drive 4 for advancing the wire 2 toward the welding zone 1 and supplying transverse oscillation to the wire 2. The output shaft 5 of the drive 4 has mounted thereon an actuator 6. According to the invention, each clamp includes a plate 7 with an aperture 8 for the passage of the wire 2, and a spring 9. The spring 9 is compressed between the housing 3 and the plate 7. The plate 7 of one of the clamps is mounted for reciprocation in the direction (indicated with the arrow) of feeding the wire 2 toward the welding zone 1 and has its lateral or side surface 10, opposite to the side surface engaging the spring 9, adapted to engage and cooperate with the actuator 6 which in the presently described embodiment is a cam or a tappet.

The housing 3 has through-going openings 11 through which the wire 2 extends, the wire 2 being engaged by the working surfaces 12 of the apertures 8 in the plates 7 of the clamps. The wire is intended to be advanced in the feeding direction indicated with the arrow. The axis of the opening 11 is perpendicular to the axis of the drive 4, while the springs 9 are coaxial with the wire 2. The clamps are able to let the wire 2 pass in one direction only, which means that the herein disclosed embodiment of the invention is an irreversible one. Let us further refer to the clamp wherein the plate 7 is reciprocable as "the movable clamp", and to the clamp mounted in the corresponding slot 13 of the housing 3 at a permanent place as "the stationary clamp".

The spring 9 always urges the plate 7 of the movable clamp toward the actuator 6, whereas the respective spring 9 of the stationary clamp urges the plate 7 thereof against an abutment 14 made as a shoulder on the housing 3. It has been found expedient that the thickness of the plate 7 of the clamp, either one, should be within a single and double thickness of the wire 2.

The diameter of the aperture 8 in the plate 7 of the clamp is preferably 0.1–0.2 mm greater than the diameter of the wire 2. The diameter of the clamp plate 7 can be 8 to 30 mm, depending on the actual design of the housing 3. It has been found that the above ratios of the dimensions provide for the wire 2 being reliably retained at the retaining points A, B and C, and likewise reliably fed into the welding zone 1. The diameter of the openings 11 in the housing 3 are preferably 0.2–0.3 mm greater that the diameter of the wire 2 being fed. Owing to the diameter of the aperture 8 in the clamp plate 7 being somewhat greater than the diameter of the wire 2, the plates 7 of the clamps are held by the action of the respective springs 9 in a somewhat inclined position with respect of the axis of the wire 2, this angle being greater than 0° but short of 90° relative to the wire-feeding direction.

Practically, as the wire 2 is being fed toward the welding zone 1, the stroke of the actuator 6 driven by the drive 4 is within 0.5 to 10.0 mm. A portion of this stroke is wasted on the bending of the wire 2 in the respective point A or C of its retaining by the plate 7; another portion of this stroke is spent on the edges 12 cutting into the body of the wire 2. Therefore, depending on the value of the resistance to the advance of the wire 2 along the hose, it is fed at every actuating pulse by a value equalling 0.8-0.9 of the stroke of the actuator 6.

Figure 5:
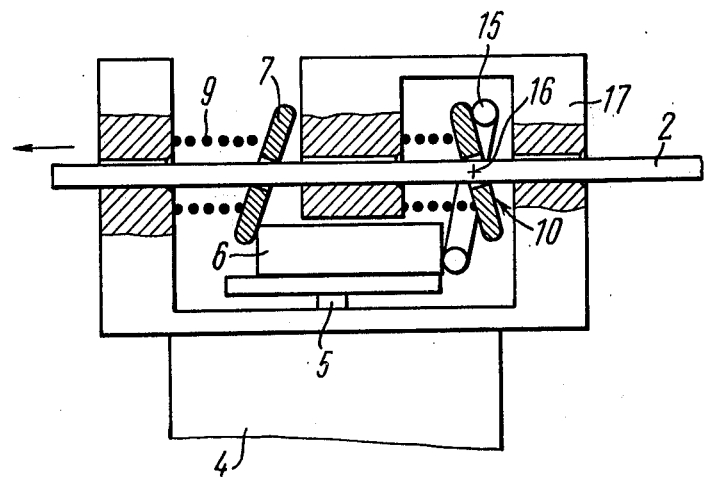
FIG. 5 is a longitudinal sectional view of an apparatus for feeding an electrode wire having a bell crank for smooth advance of the wire, in accordance with the invention.

To make the feed rate of the wire 2 more smooth, the embodiment of the appartus, illustrated in FIG. 5, is provided with a bell crank 15 mounted on a pivot pin 16 in the housing 17 and having one its arm cooperating with the actuator 6 and its other arm cooperating with the side surface 10 of the other clamp than the movable one. In this case, the reverse stroke of the actuator 6 (i.e. its stroke in the direction opposite to that of feeding the wire 2) is also utilized for advancing the wire 2 toward the welding zone 1, owing to the plate 7 of this other clamp having the motion transmitted thereto throught this bell crank 15.

Figure 6:
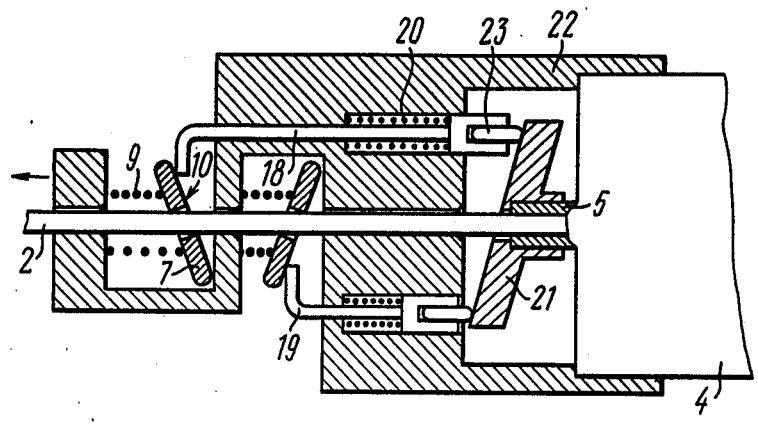
FIG. 6 is a longitudinal sectional view of an apparatus for feeding an electrode wire, with coaxial arrangement of the wire being fed and of the drive, in accordance with the invention.

In an arrangement where the wire 2 is fed toward the welding zone 1 in a motion coaxial whith the drive 4, illustrated in FIG. 6, intermediate rods 18 and 19 are incorporated in a number equalling that of the clamps, the rods 18 and 19 being urged by respective springs 20 compressed between the housing 22 and the actuator 21. To the opposite (from the actoator 21) ends of the rods 18 and 19 the plates 7 of the clamps are urged by their side surfaces 10, by the action of the respective springs 9.

The rods 18 and 19 are mounted in the housing 22 for reciprocation in a direction parallel to that of feeding the electrode wire 2 toward the welding zone 1. To reduce friction in the engagement of the rods 18 and 19 with the actuator 21, the ends of these rods, urged against the actuator 21, are provided with rotatable followers 23. The actuator 21 has a hollow axle and is in the form of either a face cam or a swash plate secured on the output shaft 5 of the drive 4.

Figure 7:
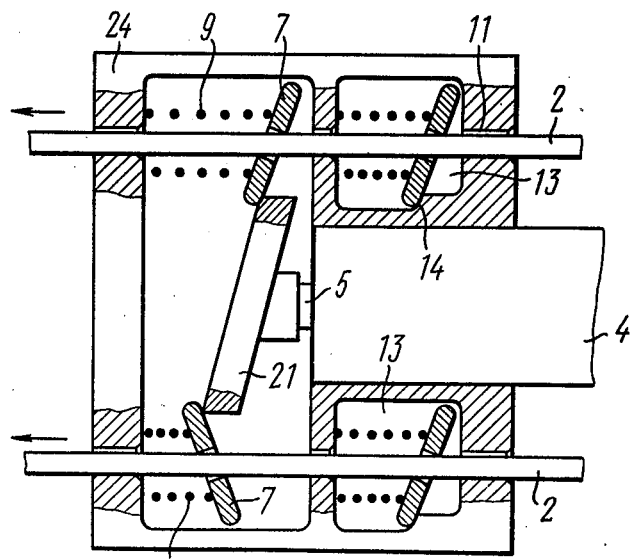
FIG. 7 is a longitudinal sectional view of an apparatus for alternatingly feeding two wires toward the welding zone, in accordance with the invention.

To feed two wires 2 alternatingly toward the welding zone 1, the apparatus illustrated in FIG. 7 additionally has another pair of clamps. The housing 24 of this apparatus has another inlet opening 11 for the other wire 2, and another slot 13 with the shoulder 14 for accommodating the plate 7 and the spring 9 of the stationary clamp of the other pair. The axes of the two inlet openings 11 are parallel with each other and parallel with the axis of the drive 4, the actuator 21 being mounted on the output shaft 5 of the drive 4, for cooperation with the plates 7 of the movable clamps. To provide for alternating feeding of the two wires 2, the inlet openings 11 in the housing 24 are made in diametrally opposing points of the latter.

Figure 8:
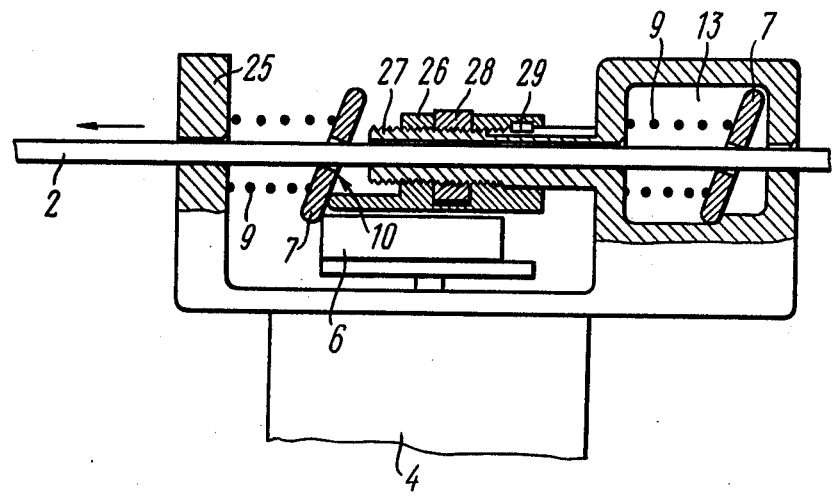
FIG. 8 is a longitudinal sectional view of an apparatus with infinite mechanical adjustment of the wire feed rate, in accordance with the invention.

To provide for mechanical adjustment of the feed rate of the electrode 2, the housing 25 of the embodiment of the apparatus, illustrated in FIG. 8, has a movable abutment 26 mounted therein, coaxially with the wire 2 being fed. The abutment 26 can be adjusted axially of the wire 2 being fed with aid of a screw-and nut couple.

The screw 27 is in the form of a projection on the housing 25, externally helically threaded. When the abutment 26 is being displaced by its nut 28 being rotated, a key 29 retains the abutment per se against rotation. Owing to the urge of the spring 9, the plate 7 of the movable clamp permanently engages the abutment 26 by its side surface 10.

Owing to the stroke of the movable plate 7 being limited by the abutment 26, but a certain part of the whole stroke of the actuator 6 is utilized for actually advancing the wire 2, in which manner the amount of the wire 2 fed by a single driving pulse is adjustable, i.e. the feed rate of the wire 2 is adjustable.

Figure 9:
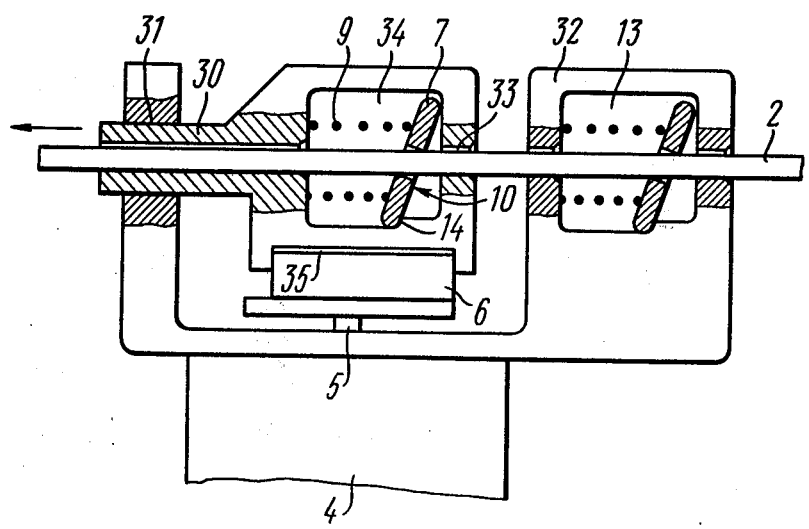
FIG. 9 is a longitudinal sectional view of the apparatus incorporating a guide for feeding and straightling an electrode wire, in accordance with the invention.

To effect feeding of the electrode wire 2 simultaneously with its trueing or straightening, the apparatus illustrated in FIG. 9 is provided with a guide 30 mounted in the opening 31 of the housing 32 of the apparatus for reciprocation in the wire-feeding direction. The guide 30 has an opening 33 for the passage of the wire 2 therethrough, and slots 34 and 35, respectively, for accommodating the plate 7 with its spring 9, and the actuator 6 of the drive 4.

Figure 10:
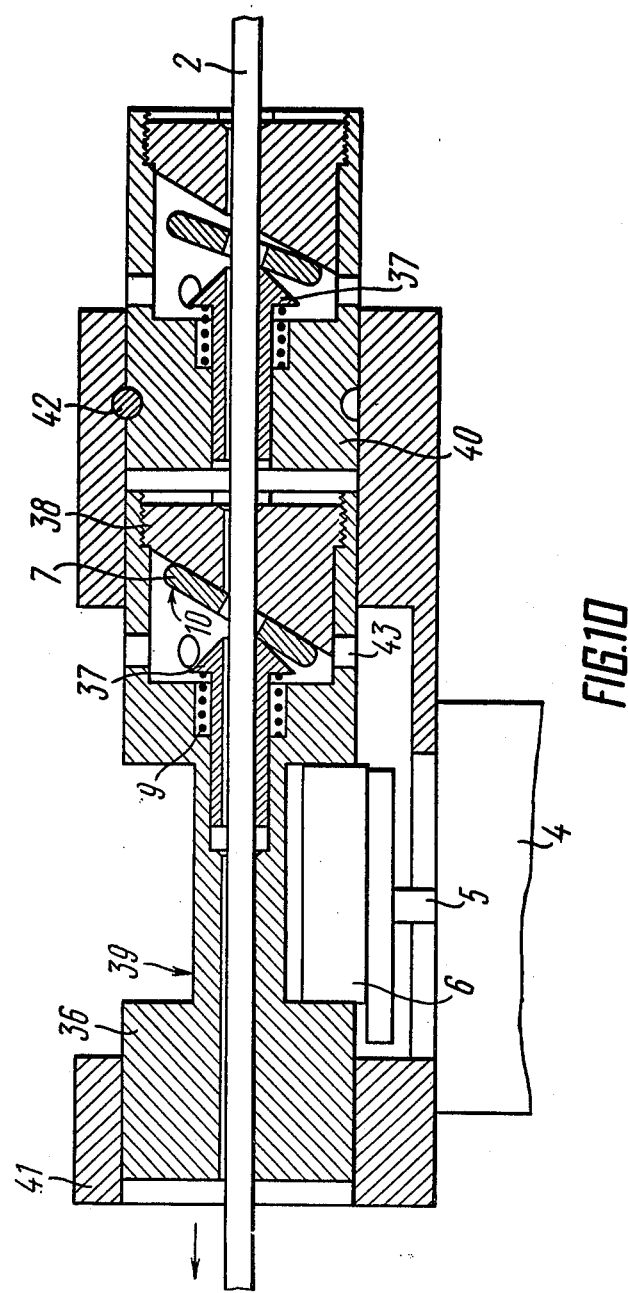
FIG. 10 is a longitudinal sectional view of an apparatus having a rod mounted on the guideway, in accordance with the invention.

To simplify the manufacturing process, in the embodiment of the apparatus, illustrated in FIG. 10, the guide 36 has a rod 37 mounted therein for reciprocation in the wire-feeding direction, urged by the spring 9 against the movable clamp plate 7. The rod 37 thus urges the plate 7 against an abutment 38 which, to simplify the manufacture of the guide 36, is threaded thereinto. The guide 7 is shaped as a body of rotation, therefore, the slot 39 for accommodation of the actuator 6 is annular, which reduces the wear of the guide 36, since the latter is able to rotate or turn about its axis in the course of feeding the wire 2.

The stationary clamp of the presently described embodiment is in the form of an individual assembly mounted in a carrier 40 coaxially with the guide 36 and fixed in the housing with a screw 42. The structure of the stationary clamp is similar, in the presently described embodiment, to that of the movable one, i.e. it has a plate 7, a spring 9, a rod 37 and an abutment 38. The walls of the guide 36 and of the carrier 40 in the areas of the accommodation of the plates 7 have openings 43 throught which scale scraped off the wire 2 by the plates 7 while feeding the wire 2 may fall out.

Figure 11:
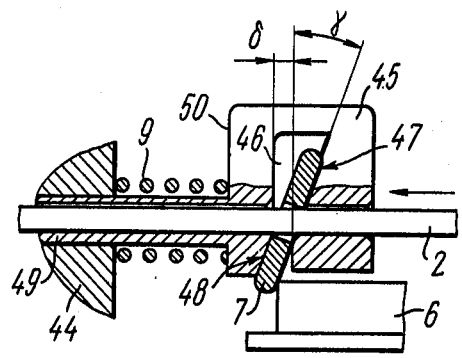
FIG. 11 is a longitudinal sectional view of a part of the apparatus, accommodating a carrier with a guide, in accordance with the present invention.

To effect feeding of thin and soft wire stock without the wire locally bending at the areas where it is gripped by the movable clamp plate 7, the housing 44 of the embodiment of the apparatus, illustrated in FIG. 11, has mounted therein a carrier 45 with a slot 46 for accommodation of the movable clamp plate 7 of which the thickness $\delta$ equals the thickness of the plate 7, and the angle $\gamma$ of inclination of the walls 47 and 48 of this slot 46 is withing a 5° to 45° range.

Should this angle $\gamma$ be short of 5°, the wire 2 might be gripped, by the plate 7, with the ratio of the dimensions of the wire 2 being fed and the clamp plate 7 being within the abovementioned range. On the other hand, if this angle $\gamma$ is in excess of 45°, the component N or S of the respective effort G and P, bending the wire 2, becomes greater than the component M or Q of the respective effort G and P, developed by the actuator 6, spent on advancing the wire 2 toward the welding zone 1, which is impractical. The carrier 45 is provided with a guide 49 supporting the spring 9 of the movable clamp thereabout, the spring 9 urging the movable clamp plate 7 against the actuator 6, by exerting its effort against the wall 50 of the carrier 45.

Figure 12:
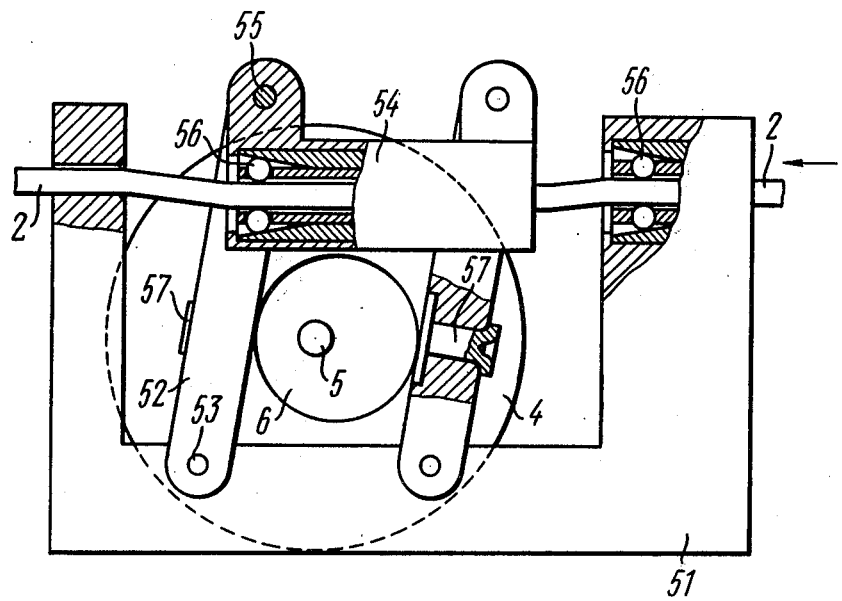
FIG. 12 is a longitudinal sectional view of an apparatus for feeding an electrode wire in accordance with the present invention, using ball)tzpe clamps.

In order to perform the herein disclosed method of feeding an electrode wire toward the welding zone, with the use of known per se clamps or gripping means, e.g. ball-type ones, and to provide for the electric insulation of the wire being fed from the drive, the embodiment of the herein disclosed apparatus, illustrated in FIG. 12, has a housing 51 having mounted therein two clamps for retaining the wire and a drive 4 for feeding the wire and applying thereupon transverse oscillation, the output shaft 5 of the drive 4 carrying an actuator 6. In accordance with the presently described feature of the invention, this embodiment includes a parallelogram linkage, the cranks 52 of the linkage cooperating with the actuator 6 of the drive 4 to receive therefrom oscillation about their pivot pins 53 mounted in the housing 51. The connecting rod 54 of this parallelogram linkage is a guide driven through translatory motion, connected with the cranks 52 with aid of pivots 55 and carrying a gripping means, e.g. ball-type gripping means of clamp 56. The other clamp 56 is stationary in the housing 51.

The cranks 52 are made of an electrically insulating material and are protected against rubbing wear in the area of their engagement with the actuator 6 by inserts 57.

Instead of the electrically insulating cranks 52, insulators may be incorporated in the pivots, and instead of the ball-type gripping means 56 either any suitable known per se gripping means, or else the plate-type clamp or gripping means of the present invention can be used.

The apparatus according to any one of the abovedescribed embodiments can have several clamps, both stationary and movable ones.

It is expedient to use more than two clamps in applications where soft (e.g. aluminum) wire stock is used, or where great resistance to the advance of the wire through the hose is encountered.

The apparatus for feeding an electrode wire toward the welding zone, illustrated in FIG. 4, operates, as follows.

The drive 4 is energized to rotate the actuator 6 which urges by its surface 10 of the movable clamp plate 7 urged by the spring 9 against the actuator 6. The diameter of the aperture 8 in the plate 7 being somewhat greater than the diameter of the electrode wire 2, the plate 7 under the action thereupon of the spring 9 and of the actuator 6 becomes inclined at a certain angle to the axis of the wire 2, this inclination angle being short of 90°. Consequently, the working surface 12 of the aperture 8 of the plate 7 engages the wire 2 in a wedge-like grip. The effort exerted by the actuator 6 is directed normally to the surface 10 of the plate 7. Under the action of the transverse component N or S (normal to the axis of the wire 2), the wire 2 sags upwardly at the point where it is gripped by the plate 7, while under the action of the longitudinal component M or Q (parallel with the axis of the wire 2), the wire 2 is advanced toward the welding zone 1. The greater the resistance to the advance of the wire 2 toward the welding zone 1, the greater is the gripping action of the plate 7 upon the wire 2. When the actuator 6 retracts its effort, the plate 7 is relieved of the effort G or P, and it moves under the action of the spring 9 to follow the actuator 6 in the direction opposite to that of the wire feed, never disengaging itself from the actuator 6. Under its inherent resilience, the wire 2 straightens at this moment, which means that it has been imparted one transverse oscillation by one double stroke of the actuator 6. The stationary clamp plate 7 in the housing 3 is permanently urged by the respective spring 9 against the abutment 14, and the action of this respective spring 9 maintains it in a permanent wedge-type gripping engagement with the wire 2. Thus, when the wire 2 is advanced toward the welding zone 1, it has to overcome the resistance of the spring 9. However, when the inherent resilience of the wire 2 tends to return the latter from the welding zone 1, the stationary clamp plate 7 engages the abutment 14, grips the wire 2 in the wedge-like action and would not let it move backward.

Should it be necessary to pull the wire back from the apparatus, e.g. during adjustments, the plates 7 are to be kept in a position perpendicular to the axis of the wire 2. The wire 2 is fed by this embodiment of the herein disclosed apparatus pulse-wise, i.e. the wire is being advanced when the actuator 6 acts in the forward direction (in the wire-advancing direction), and the wire 2 is immobile when the actuator 6 retracts its action.

The embodiment of the apparatus for feeding an electrode wire toward the welding zone, illustrated in FIG. 5, operates, as follows.

As the actuator 6 exerts its action in the forward direction, i.e. in the wire-feeding direction, this action makes the plate 7 engage the wire 2 in a wedge-like grip and thus advances the wire toward the welding zone 1. Simultaneously, the other plate 7 is moved by the action of the respective spring 9 in a direction opposite to the wire-feeding direction, the plate 7 urging by its surface 10 one arm of the bell crank 15, the other arm of the bell crank 15 engaging the actuator 6, and, consequently, moving in the wire-feeding direction. As the actuator 6 retracts its action, the first plate 7 is moved by the action of its respective spring 9 in the direction opposite to to that of the wire-feeding. At the same time the arm of the bell crank 15, engaging the actuator 6, commences motion in the direction opposite to the wire-feeding one, while the other arm of the bell crank 15 urges the plate 7 to make it grip the wire 2 and thus to advance the wire 2 toward the welding zone 1. The process of advancing the wire 2 is thus a continuous one. The backward motion of the wire 2 under its own resilience is opposed by that plate 7 which at a given moment moves forward in the wire-feeding direction.

The embodiment of the apparatus for feeding an electrode wire toward the welding zone, illustrated in FIG. 6, operates, as follows.

The actuator 21 is rotated by the drive 4, the actuator 21 being made in the form of either a face cam or a swash plate and urging the rod 18 engages the actuator 21 through the follower 23 under the action of the spring 20. The rod 18 thus moves in the wire-feeding direction, urging the plate 7 to make it grip the wire 2 and thus to advance the latter toward the welding zone, the spring 9 being in the meantime compressed. Meanwhile the rod 19 likewise engaging the actuator 21 and the other plate 7 moves in the direction opposite to that of feeding the wire 2, and, consequently, the other plate 7 is moved backward by the action of the respective spring 9. With the actuator 21 having turned through 180°, a reversed sequence takes place, i.e. the rod 18 reverses its motion, while the rod 19 feeds the wire 2 toward the welding zone 1. Thus, the wire 2 is continuously fed into the welding zone 1, receiving two oscillations in the transverse direction at one revolution of the actuator 21.

The embodiment illustrated in FIG. 7 operates, as follows.

With the actuator 21 being rotated, it urges the movable clamping plate 7 associated with the first electrode wire 2 and moves the latter toward the welding zone 1. The movable clamping plate 7 associated with the second electrode wire 2 is retracted by the action of its spring 9, while the stationary clamping plate 7 associated with this second wire 7 retains the latter from backward motion, which means that the second wire is not advanced at this moment. With the actuator having rotated through 180°, it starts urging the movable clamping plate 7 of the second wire 2, to advance the latter toward the welding zone 1. In the meantime the movable clamping plate 7 of the first wire 2 is retracted by its spring 9, while the stationary clamping plate of the same wire 2 retains the latter from backward motion. Then the abovedescribed cycle is repeated. Thus, wires 2 are alternatingly fed into the welding zone 1.

The embodiment illustrated in FIG. 8 operates, as follows.

The actuator 6 is operated by the drive 4 and urges the movable clamping plate 7, whereby the latter grips the wire 2 and advances it toward the welding zone 1. As the actuator 6 retracts its action, the plate 7 is moved by the spring 9 in a direction opposite to the wire-feeding direction, until it engages the abutment 26 and is halted thereby, while the actuator 6 completes its retracting step.

Consequently, as the actuator 6 is driven through its forward motion, it for a certain part of its stroke does not engage the movable plate 7, which means that the wire 2 is not advanced during this period toward the welding zone 1. Then it engages the plate 7, whereby the latter grips the wire 2 and advances it toward the welding zone 1. The position of the abutment 26 relatively to the stroke of the actuator 6 is determined by the position of the nut 28 engaging the set screw 27, since this rotation moves the abutment 26 along the axis of the electrode wire 2. When driven to its extreme left-hand position (in the drawing), the abutment 26 prevents the engagement between the plate 7 and the actuator 6 altogether, so that the rate of feed of the wire 2 equals zero. In its extreme right-hand position it lets the plate 7 move through full strokes of the actuator 6, and the rate of feed of the wire 2 is at the maximum. By adjusting the abutment 26 appropriately, any intermediate rate of feed can be preset.

The apparatus for feeding an electrode wire toward the welding zone, illustrated in FIG. 9, operates, as follows.

The actuator 6 is operated by the drive 4 to urge the guide 30 and thus to move the latter in the wire-feeding direction in the opening 31 of the housing 32. The abutment 14 of the guide 30 urges the surface 10 of the movable plate 7, so that the latter grips the wire 2 and advances it toward the welding zone 1. While the actuator 6 moves through its reverse stroke, the guide 30 moves in the direction opposite to the wire-feeding one, moving the movable plate 7 with the respective spring 9 therealong. While moving backwardly, the movable guide 30 slides onto a bent portion of the wire 2 being fed and straightens this wire 2 by the edges of the opening 33, with the effort equalling the feeding effort M or Q. In the meantime the stationary clamping plate 7 would not let the wire 2 move in the backward direction. In this way straightened wire is always advanced to the movable clamping plate 7, and interruptions in the wire feed are prevented.

The apparatus for feeding electrode wire toward the welding zone, embodying the present invention and illustrated in FIG. 10, operates, as follows.

The actuator 6 rotated by the drive 4 and accommodated in the slot 39 of the guide 36 urges, during its forward stroke, the movable clamping plate by the abutment 38, the plate 7 being urged thereto by the respective spring 9 throught the rod 37. Consequently, the last-mentioned plate 7 grips the wire 2 and feeds it into the welding zone, the maximum inclination of the plate 7 being limited by the abutment 38. The free span of the wire in the gripping zone is likewise minimal, since the head of the rod 37 adjoins the plate 7. As the actuator 6 moves throught its retracting stroke, the guide 36 with the plate 7, the spring 9 and the rod 37 follow the motion, and the plate 7 is free to turn only to a position perpendicular to the axis of the wire 2, its further inclination and displacement being prevented by the head of the rod 37, which in the meantime abuts against the wall of the guide 36, compressing the spring 9.

With the actuator 6 rotating, the guide 36 is also rotated about its axis by the friction engagement with the actuator 6, so that the latter engages ever newer portions of the slot 39, which reduces the wear of the walls of the slot 39. The stationary clamping plate 7 with its spring 9, jointly with the rod 37, retain the wire 2 from backward motion. In this embodiment, also with the aim of preventing formation of local bends in the wire 2, the inclination angle of the plate 7 is limited by the abutment 38, and the free span of the wire 2 is minimized by the rod 37.

The apparatus for feeding electrode wire toward the welding zone, illustrated in FIG. 11, operates, as follows.

While moving through its forward actuating stroke, the actuator 6 urges the movable clamping plate 7, so that the latter grips the wire. But, irrespectively of the resistance to the advance of the wire 2 toward the welding zone 1, as the wire is being thus gripped, the maximum inclination of the plate 7 is limited by the walls 47 and 48 of the slot 46 of the carrier 45. Even if the advance of the wire 2 is completely halted, e.g. when the wire becomes welded to the current-conducting tip, no local bending of the wire 2 in the gripping mechanism takes place, since there is no free span of the wire 2, and the wire simply has no space to bend, with the thickness of the plate 7 enqualling the width δ of the slot 46. As the plate 7 moves forward, i.e. in the wire-feeding direction, the carrier 45 with the guide 49 move therewith, compressing the respective spring 9. When the actuator 6 moves through its retracting stroke, the carrier 45 and the plate 7 also move in the backward direction, under the action of the spring 9.

If the resistance to the advance of the wire 2 overcomes the gripping action, the plate 7 slides along the wire 2, minimally harming the latter. When the resistance to the advance of the wire is relieved, the wire-feeding operation is resumed without any readjustment of the apparatus.

The embodiment of the presently disclosed apparatus, illustrated in FIG. 12, operates, as follows.

The actuator 6 rotated by the drive 4 urges the crank 52 through the insert 57, this action being transmitted through the pivotal connection 55 to the guide 54, and, consequently, to the ball-type grip 56, which latter grips the wire 2 and advances in into the welding zone 1. While being thus advanced, the wire 2 is driven throught transverse oscillation, since the guide 54 moves forward and at the same time upward, i.e. tranversely of the axis of the wire 2, bending the latter. Upon having risen to its predetermined uppermost position, the guide 54 lowers back. Upon the actuator 6 having rotated through 180°, the guide 54 rises once again, attains its uppermost position and lowers back. In the meantime the wire 2 is not advanced, its backward motion being prevented by the stationary clamp 56 rigidly mounted in the housing 51.

In this manner the wire 2 is fed in a pulsing motion with transverse oscillation toward the welding zone 1. Owing to the electric insulation of the cranks 52, the electric current cannot flow from the wire 2 to the drive 4.

What we claim is:

1. A method of feeding an electrode wire toward a welding zone, comprising the steps of selecting two points for retaining said wire, alternatingly retaining said wire at one of said two retaining points, and applying to said wire at the other one of said retaining points, at an angle substantially less than 90° relative to the direction of feeding said wire toward the welding zone, an effort causing transverse and longitudinal oscillation of said wire.

2. A method as set forth in claim 1, including the steps of selecting at least one additional retaining point and applying to said wire at said additional retaining point, at an angle substantially less than 90° relative to the direction of feeding the wire toward the welding zone, an effort causing transverse and longitudinal oscillation of said wire.

3. A method as set forth in claim 1, including the steps of selecting at least one additional retaining point and applying to said wire at said additional retaining point a pulsing effort causing longitudinal oscillation of said wire.

4. An apparatus for feeding an electrode wire toward a welding zone comprising a housing, drive means in said housing for feeding the electrode wire toward the welding zone and for causing transverse oscillation thereto, said drive means comprising a cam-type actuator mounted on a drive shaft, at least two gripping means for retaining said electrode wire accommodated in said housing, each gripping means comprising a plate with an aperture for passage of said electrode wire therethrough and a spring means for urging the plate in a direction opposite to the direction of feeding of said electrode wire toward the welding zone, wherein a plate of one of said gripping means is mounted for repciprocation in the direction of feeding of said electrode wire and has a side surface positioned adjacent and cooperating with said cam-type actuator for movement thereby for feeding the electrode wire and for imparting transverse oscillation thereto.

5. An apparatus as set forth in claim 4, further comprising a bell crank mounted in said housing, having one arm positioned adjacent said cam-type actuator at a point opposite to the point of cooperation of said cam-type actuator with said plate of one of said gripping means and its other arm cooperating with said plate of said other gripping means, said latter plate being mounted for reciprocation in the direction of feeding the wire toward the welding zone.

6. An apparatus as set forth in claim 4, comprising a plurality of intermediate rods equal in number to the number of gripping means, each rod mounted for reciprocation in the direction of feeding the wire toward the welding zone; each rod having one end cooperating with said cam-type actuator and its other end cooperating with a side surface of a respective plate, each said plate being mounted for reciprocation in the direction of feeding the wire toward the welding zone.

7. An apparatus as claimed in claim 4, comprising an additional set of at least two gripping means for feeding two electrode wires alternatingly toward the welding zone, wherein the plate mounted for reciprocation of each set of at least two gripping means cooperates with said actuator at diametrically opposite points.

8. An apparatus as set forth in claim 4, comprising a movable abutment means mounted in said housing for limiting the reverse stroke of said plate mounted for reciprocation.

9. An apparatus as set forth in claim 4, comprising a guide mounted in said housing for reciprocation in the direction of feeding the wire toward the welding zone and having slots made therein; said plate mounted for reciprocation being accommodated in one of the slots of said guide; said actuator driving said guide through reciprocating motion being accommodated in another slot of said guide.

10. An apparatus as set forth in claim 9, further comprising a rod biassed by a spring mounted in said slot accommodating said plate mounted for reciprocation, said rod having one end cooperating with said spring and its other end cooperating with a side surface of said plate mounted for reciprocation.

11. An apparatus as claimed in claim 4 comprising a carrier means for carrying said plate mounted for reciprocation in said housing for reciprocation in the direction of feeding the wire toward the welding zone, said carrier means having a slot made therein for accommodation of said plate mounted for reciprocation, and a guide means for supporting said spring means of said movable gripping means, wherein said spring means urges the plate mounted for reciprocation through said carrier means, and wherein the width of said slot of said carrier means substantially equals the width of said plate, and the angle of inclination of the walls of the slot is substantially between 5° and 45°.

12. An apparatus for feeding an electrode wire toward a welding zone comprising a housing, drive means in said housing for feeding the electrode wire toward the welding zone and for causing transverse oscillation thereto, said drive means comprising a cam-type actuator mounted on a drive shaft, at least two gripping means for retaining said electrode wire accommodated in said housing, and one of said gripping means being stationary; a parallelogram linkage including a pair of substantially parallel crank arms cooperating with said cam-type actuator for receiving oscillatory movement therefrom, a connecting rod of said linkage interconnecting said crank arms and adapted to be driven thereby, said connecting rod including a guideway adapted to be driven through translatory motion, said guideway carrying the other one of said gripping means.

* * * * *